United States Patent [19]

Fredriksson

[11] Patent Number: 5,696,911
[45] Date of Patent: Dec. 9, 1997

[54] ARRANGEMENT FOR ELIMINATING MALFUNCTION AND/OR PERMITTING HIGH-SPEED TRANSMISSION IN A SERIAL BUS CONNECTION, AND TRANSMITTER AND RECEIVER UNITS LINKED TO THE LATTER

[76] Inventor: Lars-Berno Fredriksson, S-51157, Kinna, Sweden

[21] Appl. No.: 763,349

[22] Filed: Dec. 11, 1996

Related U.S. Application Data

[63] Continuation of Ser. No. 422,889, Apr. 17, 1995, abandoned.

[30] Foreign Application Priority Data

Apr. 18, 1994 [SE] Sweden ................................. 9401305

[51] Int. Cl.[6] ............................................ G06F 13/00
[52] U.S. Cl. ................................ 395/286; 295/287
[58] Field of Search .................. 370/24, 85.1; 395/730, 395/290, 658, 286, 287

[56] References Cited

U.S. PATENT DOCUMENTS

| | | | |
|---|---|---|---|
| 4,412,286 | 10/1983 | O'Dowd | 396/650 |
| 4,887,262 | 12/1989 | Van Veldhuizen | 370/85.1 |
| 5,105,441 | 4/1992 | Borst et al. | 375/17 |
| 5,121,386 | 6/1992 | Wolfsgruber et al. | 370/85.1 |
| 5,263,163 | 11/1993 | Holt et al. | 395/225 |
| 5,323,385 | 6/1994 | Jurewicz | 370/43 |
| 5,384,769 | 1/1995 | Oprescu et al. | 370/24 |

*Primary Examiner*—Jack B. Harvey
*Assistant Examiner*—David A. Wiley
*Attorney, Agent, or Firm*—Pollock, Vande Sande & Priddy

[57] ABSTRACT

A system includes a bus connection, and transmitter and receiver units linked to this bus connection. The connection is digital and can assume one of two signal states, zero and one. Each unit assumes listening and transmitting positions and operates with an access function to the bus. Only designated or selected units can be activated so as to be able to transmit dominant signals or pulses, in this case zeroes. Said designated or selected units are located at a distance from each other which is substantially shorter than the total length of the connection. Dominant signals which can be assigned to an acknowledgement function in the system are emitted only by the selected or designated units. Other units are prevented from transmitting the respective dominant signal and assume only a listening position on the bus connection.

28 Claims, 4 Drawing Sheets

I and II are master units

ARRANGEMENT FOR ELIMINATING MALFUNCTION AND/OR PERMITTING HIGH-SPEED TRANSMISSION IN A SERIAL BUS CONNECTION, AND TRANSMITTER AND RECEIVER UNITS LINKED TO THE LATTER

This application is a File Wrapper Continuation of U.S. patent application Ser. No. 08/422,889, filed Apr. 17, 1995, now abandoned.

TECHNICAL FIELD

The present invention eliminates a malfunction or malfunctions in a serial connection to which transmitter and receiver units are linked. In addition, or alternatively, the invention can permit high-speed transmission between the units or groups thereof. The connection in this case operates with digital transmission. The connection can assume one of two signal states, the first signal which can be represented by a zero, being dominant over the second signal state, which is represented by a one. Each transmitter and receiver unit is arranged to assume listening and transmitting positions, and each unit is additionally designed to operate, upon access to the connection, with some form of protocol function to secure access for transmission on the serial connection. In this context, reference may be made to timing-based protocols, or a so-called daisy chain protocol, or an arbitration function. In the latter case of arbitration, the unit attempting access outputs a signal with, or listens at, the second state. If the unit in this listening position does not receive a dominant signal during a predetermined time for which the second state/pulse lasts, the access is obtained. If, in contrast, the unit receives said dominant signal or pulse, which represents an indication of the fact that another transmitter and receiver unit has access, or is in the process of acquiring access, to the connection, the unit returns to its listening position and waits to obtain access. When access is obtained, the respective transmitter and receiver unit has the possibility of transmitting information, via the connection, to the other transmitter and receiver unit concerned, master, or another unit, together with control data. The transmitter and receiver unit in question obtains, via the connection, a dominant acknowledge signal, i.e. zero, from the respective unit or a unit receiving the information.

PRIOR ART

High-speed communication over great distances using systems which operate with data protocol be already known and can be based on a connection access in accordance with the access function of bitwise arbitration mentioned in the introduction. A method for solving the problem of collisions of multiple data transmissions on a connection for serial data communication, for example an electric two-wire bus, is to use the arbitration type of protocol. A well-known example of this is the system which operates with the CAN data transmission protocol, which has been developed by the German company Robert Bosch.

In the industry, it is often the case that the transmitter/receiver units are physically grouped, and that these groups are located at great distances from each other. In this context, short distances are understood to mean several meters, and great distances are understood to mean several hundred meters up to a kilometer or so.

Another well-known method for regulating access to the data transmission medium in data communications is token passing. The unit which in this case has the token also has access to the medium or the connection. Following transmission, the token is freed, and other units can gain access to said token. There are also other methods for allocating access to a transmission medium, and in this respect reference may be made to slotted bus, time division, etc., which are well known to the average person skilled in the art.

Other well-known architecture for solving problems with data transmission between groups at great distances from each other is the so-called bus bridge function. This is characterized by the fact that in each group there is a unit which is linked both to the locally common group and to a corresponding unit in the other group. The bridge unit collects information from the local bus which is to go to the other bus, and it transmits this to the bridge unit in the other group, which distributes the information on the local bus.

DESCRIPTION OF THE INVENTION

Technical Problem

There is a need to further be able to develop said CAN system protocol. In the known system the data transmission speed is dependent on the distance between the transmitter/receiver units situated farthest from each other. This is due to the fact that all the linked transmitters/receivers have to postpone determining the value of the inserted signals with respect to the access and acknowledge functions so that the signal in question has time to propagate to the most distant transmitter/receiver unit and back again, which results in effects which limit the data transmission speed. The invention aims to solve this problem, among others.

In the known procedure for acknowledgement of the message, the transmitter outputs a recessive signal after the data and a check code have been transmitted to the destination receiver. If the receiver has processed the message correctly, the receiver in question outputs a dominant signal on the connection, and the transmitter knows that the message has proceeded correctly. If a transmitter and receiver unit interprets the message as incorrect, said unit outputs an error signal consisting of dominant signals. The invention will be able to be used in this connection and also solves this problem.

The data transmission speed should be able to be maintained over even longer distances and should not be limited to the total length of the communication link. The invention solves this problem too.

The known arbitration methods, for access to the transmission medium, and acknowledgement methods which have previously been described, and which are applied in the known CAN system, also have many advantages which it is desirable and necessary to be able to maintain. By means of the invention, it is possible to use the basic structure of the CAN system (protocol) and still overcome the abovementioned disadvantages that the bandwidth decreases with communication over increased distance.

The invention will also prevent transmitter/receiver units, which are set at an incorrect frequency, from gaining access to the connection and spoiling the communication for units which are set at the correct frequency.

In addition, it will be possible for master functions to be built into the system and for higher protocols to be arranged to rectify incorrectly transmitted messages.

The invention will also make it possible for components for the systems in question to be produced by different specialists. Thus, system designers will be able to elaborate system architecture and system functions independently of
} component manufacturers for said transmitter/receiver units, nodes, circuit boards, etc.

Solution

The invention proposes that a group having at least two transmitter and receiver units will be allocated exclusive access to the medium for transmission, while all the transmitter and receiver units can still listen in. In this way, the bandwidth is limited only to the distance within the group, which can be regarded as a main group with subgroups of active transmitter/receiver units. Respective units within the main group can gain access to the medium or the connection by means of arbitration, and the units within the group execute acknowledgement or error signalling on the basis of whether the transmitter and receiver have interpreted the message as correct or incorrect. Such an activated group is here called an active group. Other main groups come to interpret the same message and make the same check, but they do not output an error signal on the medium if they interpret the message as incorrect and are here referred to as passive main groups. If any unit in the passive main groups interprets a message as incorrect, then, in one embodiment, this information can be dealt with at a higher protocol level, i.e. the transmitter/receiver unit does not emit an error signal on the transmission medium if the error relates to an earlier, passive, period when it has changed to being active. This embodiment of the inventive concept proposes the use of known a plurality of methods for error-handling at a higher protocol level, and the optimum application of these methods depends on the system requirements.

In one embodiment, the problems mentioned in the introduction are solved by using a bridge unit function in which the bus in question can be common to both subgroups involved. In each main group, one unit has a higher rank than the other units and can prevent these from transmitting on the bus. Such a higher-ranking unit is thus designed with a master function or as a master unit. By virtue of the fact that each master alternately permits transmission for its groups, a communication can be maintained with a bandwidth which is defined by the distance between the most distant transmitter/receiver units within a main group. In one embodiment, the master unit orders its main group to a passive position by means of a special message on the bus. When the master in the other main group receives this message, it orders its main group to an active position. To be able to transmit the message to change from passive to active position, the master unit is equipped with two T/R units, the one unit having the task of checking that the message from the other unit appears correctly on the medium. The other unit then acknowledges the message in a conventional manner.

In one embodiment, all the units can be developed to communicate only within one main group. In this case, the units must have the ability to change to the passive position described above. In certain cases, it can also be an advantage if, when the unit comes to the active state, said unit specifies whether, during the preceding passive state, it interpreted any message as incorrect. Only the master units need to have an error-handling protocol at a higher level in order to deal with the case where one group interprets a message as correct, while the other group interprets it as incorrect. If each group has an error-handling protocol and a media access protocol, for example of the token passing type, no master units are needed.

In a further embodiment, said bridge unit function is used. In present-day applications, with the CAN system protocol for example, the transmission speed is limited by the distance, despite the fact that it is a simple matter to ensure that a message collision cannot occur since the acknowledgement procedure is assumed to take place within a certain time period. A solution according to the invention is that bridge units are equipped with two transmitter/receiver units. These lie at a short distance from each other (a few centimeters), and the delay between these units is no longer dominated by the physical distance, but instead by internal delays, which are essentially of a computational nature. With good cable quality, it is possible to transmit the message in accordance with the CAN protocol, and standard components intended for this purpose, for example Philips 82C200 CAN CONTROLLER, while a bit rate of 1.6 MHz over distances well in excess of 1 kilometer is possible, which fact substantially increases the transmission bandwidth. According to current techniques, it is approximately 50 kHz at a distance of 1 kilometer, and the bandwidth thus increases by a factor of 32.

In accordance with the above, the feature which can principally be regarded as characterizing the novel arrangement is that, in the system, only designated or selected transmitter and receiver units, which are situated at a distance from each other which is preferably substantially shorter than the total length of the connection, are activated in order to be able to transmit in accordance with one or both of the following alternatives: the dominant signals/pulses affected by both the access and acknowledgement functions, and/or the dominant signal or signals affected only by the acknowledgement function or the acknowledgement functions. Other transmitter and receiver units included in the system are prevented from transmitting said dominant signal or signals, but are arranged to assume a listening position on the bus connection.

DESCRIPTION OF THE FIGURES

A presently proposed embodiment of an arrangement which has the features characteristic of the invention will be described hereinbelow with reference to the attached drawings, in which.

DETAILED EMBODIMENT

Figure 1:
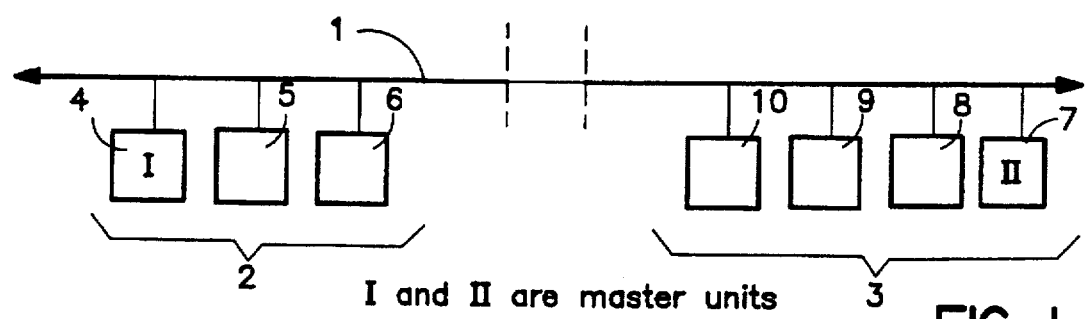
FIG. 1 shows, in a circuit diagram, a bus connection, and transmitter and receiver units which are linked to this bus connection in groups.

Since the object of the present invention is to improve considerably the CAN communications system which is known per se, the basic functions with which this system operates will be discussed here.

The system is based on a serial electrical two-wire communications bus. A signalled zero is dominant over a signalled one. NRZ, non return to zero, i.e. if several identical characters are transmitted, the level on the bus is not changed. Under normal conditions, a maximum of five identical characters are transmitted in a row. If the transmitted message includes more than five identical characters in a row, then the T/R unit inserts an extra, opposite, character. If no transmission is taking place, the bus represents a continuous transmission of ones. When a unit wants to transmit, it first counts a number of ones, i.e. the bus is free, and then transmits a zero, so-called start of frame. All units which have just considered beginning to transmit append this zero, and in this way synchronize to the signaling pattern. All the units read the bus, i.e. including those which are transmitting. If a transmitter transmits a one but reads a zero, it draws the conclusion that a party with higher priority is transmitting at the same time. In this way, only one transmitter is finally left. When the arbitration field or stage is over, the transmitter indicates how many bytes it will transmit. After these have been transmitted, there is a check sum. All receivers calculate the corresponding sum in parallel. After the receiver has transmitted the check sum, it transmits a one. All the receivers which have obtained the same sum transmit a zero. The transmitter then accepts that at least one party has listened and understood and that none have thought it was incorrect. In such a case, this would have sent an error frame consisting of six zeroes, i.e. against the rule relating to five identical characters in a row. From the above, it is understood that an output character must remain as long as it takes for a T/R unit to output the character on the bus, that the character is conveyed on the bus to the most distant T/R unit in the system, multiplied by 2. To ensure that the bus is free, i.e. to render arbitration unnecessary, a timetable-based protocol or a daisy chain protocol is simply used, for example.

The problem is the acknowledgement method according to the above. That the acknowledgement zero will reach the transmitter from the most distant unit while the transmitter is still signaling a one. The invention solves this problem by preventing the T/R units, in groups, from emitting zeroes. Only one group at a time is permitted to transmit zeroes. The fact that the acknowledgement zero is not transmitted between groups and that arbitration does not take place between groups means that communication between groups can be transmitted on a single optical link or via radio. An advantage of the method in accordance with the last-mentioned principle is that so little of the protocol is changed. The actual coding of the content of the message does not need to be changed at all, and the greater part of the CAN protocol is carried out in the normal way, for example the different control functions. In the above text, it has been assumed that all the units are communicating with the same bit rate. It will be easily seen from the above that if any unit signals with another bit rate, then an error occurs. For example, if any unit uses a bit rate which is less than a sixth of that of the others, then a zero transmitted by this unit will be interpreted by all the others as an error frame. This situation is prevented by means of the invention, by virtue of the fact that no node in a group is permitted to transmit a zero until it has obtained a clear signal from its master unit. If a unit is set at the wrong bit rate, it will never be able to receive messages from the master unit. The arrangement according to the invention can be used for solving the problem in accordance with the last-mentioned consequence only if distances are not a problem.

The invention permits a higher communication speed with the CAN protocol than that which is indicated by the protocol specification, and it prevents CAN units with an incorrectly set bit rate from spoiling the communication for those which are correctly set. Delays in commonly occurring leads for CAN are 5 nanoseconds per meter. A typical value for delay at present for a CAN controller is about 10 ns, which corresponds to a 2-meter lead. The delay in the bus driving circuit is about 80 ns, corresponding to 16 meters. With the invention and a point to point communication, only the delay in the CAN controller is dimensioned since the distance between T/R 1 and 2 is only about one cm, and acknowledgement can take place before the driver. I.e. a bit rate of 100 MHz should be possible from the delay aspect. At the present time, Philips controllers are rated for 1.6 MHz, but it is technically possible to make substantially faster chips.

In FIG. 1, a bus connection is indicated by 1. Linked to the connection are main groups 2 and 3 of transmitter/receiver units which are divided into subgroups 4, 5, 6 and 7, 8, 9, 10. According to the invention, the main groups are activated one at a time, while the other or remaining main groups are passive. The number of subgroups can vary, and each subgroup can include one or more transmitter/receiver units.

Figure 2:
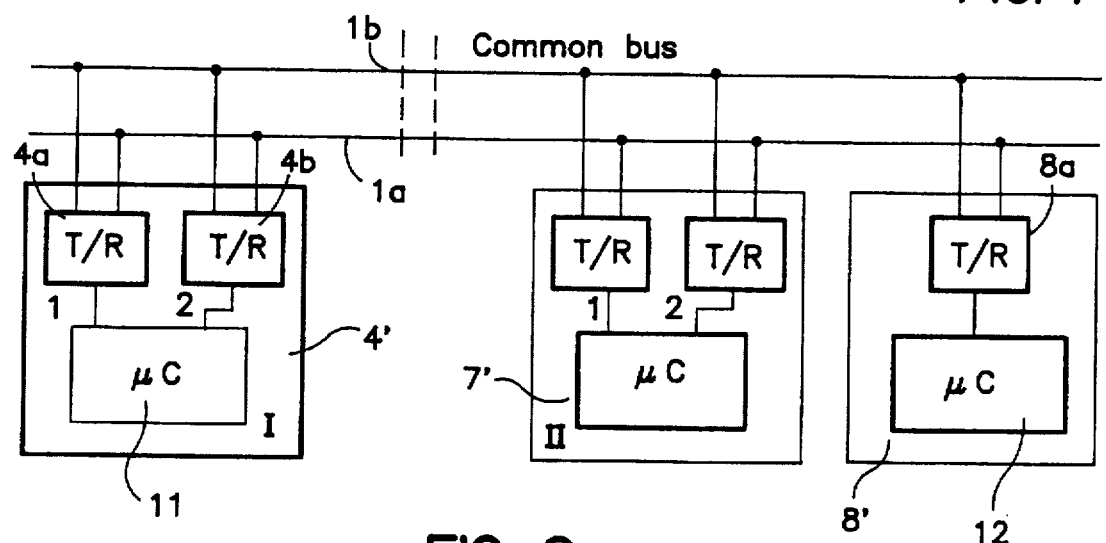
FIG. 2 shows, likewise in circuit diagram form, and on an enlarged scale, parts of the system according to FIG. 1.

In accordance with FIG. 2, the bus connection can be made up of a two-wire connection with branches 1a and 1b. The receiver 4' serves as master unit (cf. the unit 4 in FIG. 1). The master unit is provided with two transmitter/receiver units 4a, 4b and a data control unit 11 which consists of a microcontrol unit. The master unit 7' (=the unit 7 in FIG. 1) is constructed in the same way as the master unit 4'. The units which do not have a master function in the respective main group can have a configuration in accordance with the unit 8', i.e. only one transmitter/receiver unit with associated microcontrol unit 12. Said units 4–10, 4', 7' and 8' have a structure which is known per se, and in this respect reference may be made to the structure of the CAN system discussed hereinabove.

Figure 3:
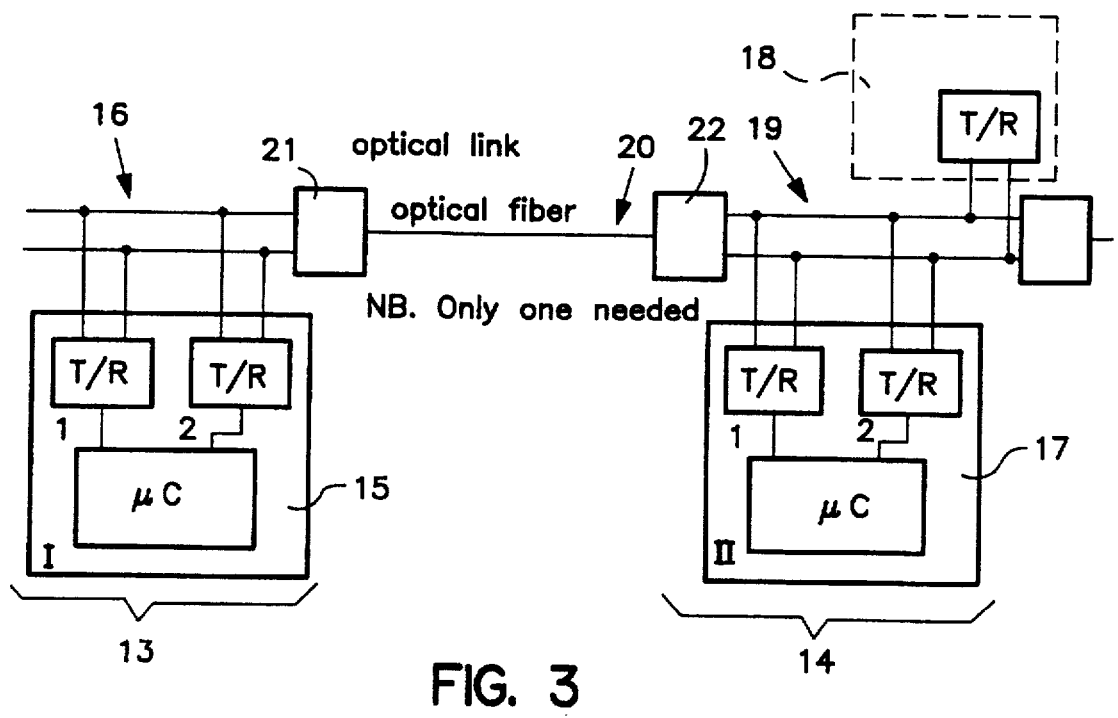
FIG. 3 shows, in circuit diagram form, transmission via a single optical link.

FIG. 3 shows the main groups 13 and 14, with only the master unit 15 having been shown in the group 13. The bus connection has been indicated here by 16. In the group 14, the master unit 17 and the unit 18 have been shown, cf. above. The bus connection has in this case been designated by 19. The bus connections are joined via an optical fiber/link 20 which can consist of only one fiber link in the illustrative example. Between the bus connections 16, 19 and said fiber link 20, adaptation units and possible buffer units have been indicated by 21 and 22.

Figure 4:
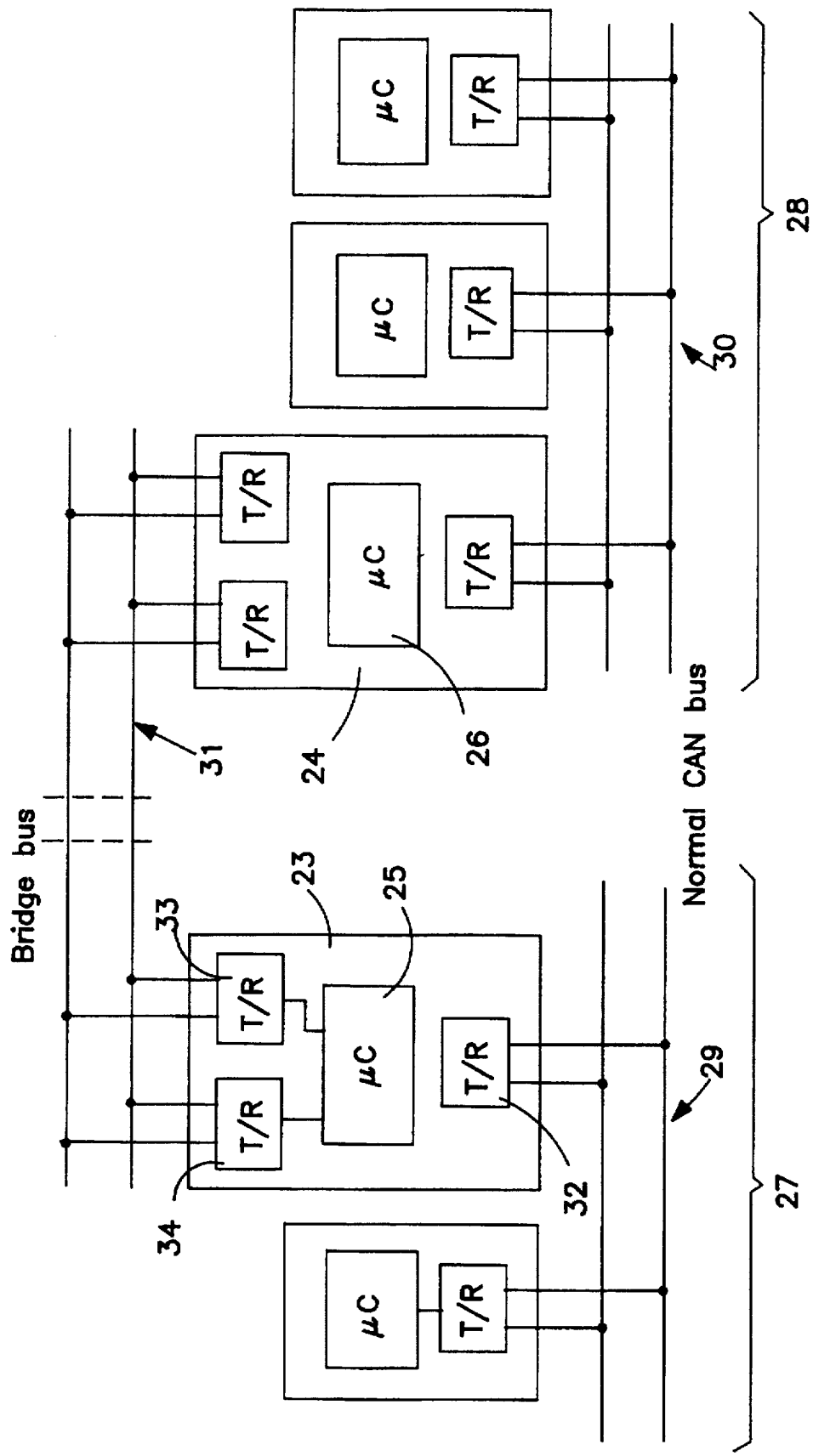
FIG. 4 shows the invention applied on a bridge connection.

FIG. 4 shows a bridge bus system with associated units 23 and 24. The latter units can consist of circuit boards which are known per se and which have microcontrol units 25 and 26, respectively. Each unit is linked to its main group 27 and 28, respectively, via normal bus connections (CAN bus connections). The bridge bus connection is indicated by 31. The link to the CAN connections is made via a transmitter/receiver unit 32, and the link to the bridge bus connection is made via transmitter/receiver units 33 and 34, one of the last-mentioned transmitter and receiver units having the task of detecting the acknowledgement signal in question, in accordance with the above.

Figure 5:
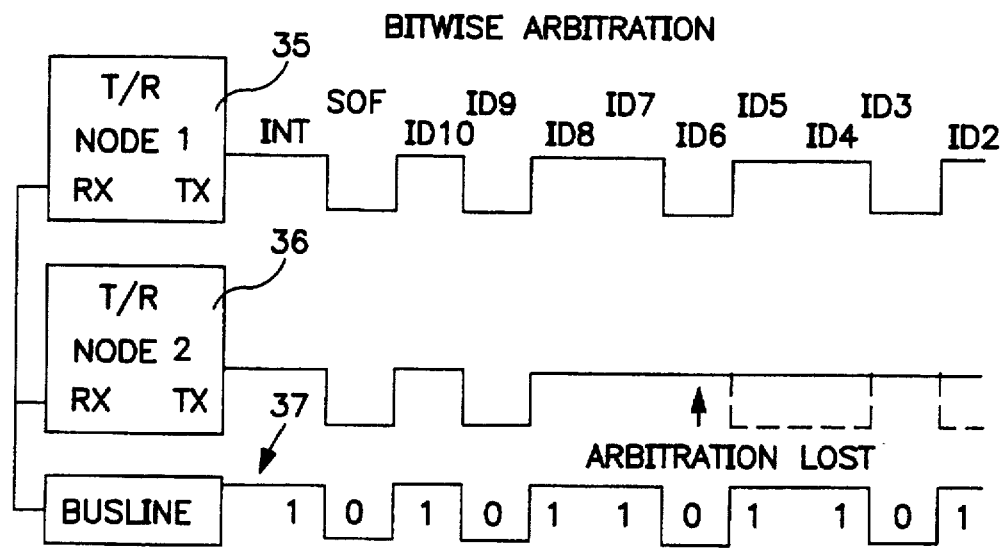
FIGS. 5 to 10 show, in block diagram and pulse diagram form, the principle of the bitwise arbitration system structure.

FIG. 5 shows the principle of bitwise arbitration. In this case, the respective transmitter/receiver is indicated by 35 and 36, respectively, and the connection by 37. As the principle is known per se, it will not be described in any detail here.

In one embodiment, the master unit has only one T/R module unit. When the master transmits its message to the effect that the units are to assume the active mode, the master unit does not receive an acknowledgement. It will then transmit the message again, in accordance with the CAN protocol, up to about 10 times. As soon as a unit in the group has assumed the active position, it will give an acknowledge signal. If any unit is in this case able to assume the active mode within the retransmission time, it is possible to manage with the master unit having only one T/R unit, which thus constitutes a solution according to the invention.

Figure 6:
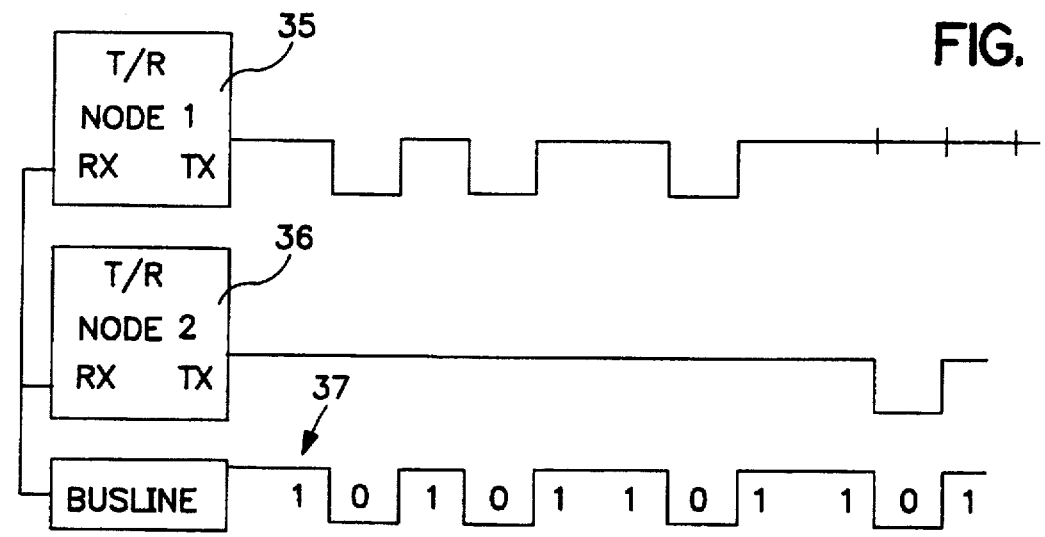
Figure 7:
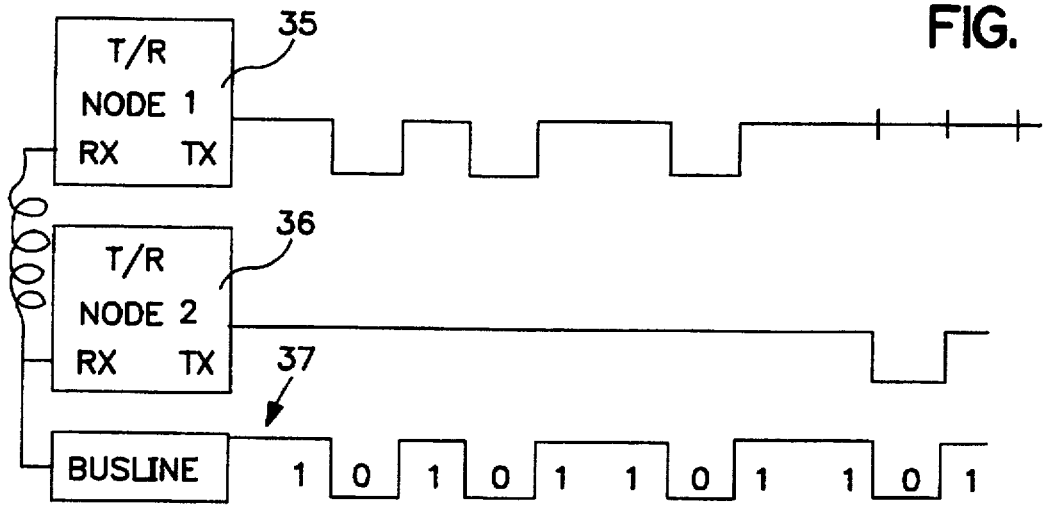

As regards the acknowledgement procedure, reference is also made to FIGS. 6 and 7. Node 1 (=unit 1) is transmitting a message which has just terminated. The position when the unit transmits a one, while the node (the unit) acknowledges with a zero, is marked, as is the following one which is transmitted by both. The signal levels on the bus in the vicinity of the node or the unit 2 are shown at the bottom. In FIG. 7, the distance is great, and we can see that the node or the unit 2 senses the signals later than when node 1 is transmitting said signals. When node 1 is expecting node 2 to overwrite its one, node 2 reads the last character. When unit 2 then outputs its zero, it comes to node 1 too late. The unit 1 perceives that the zero never came, while the expected subsequent one is instead zero, i.e. error.

Figure 8:
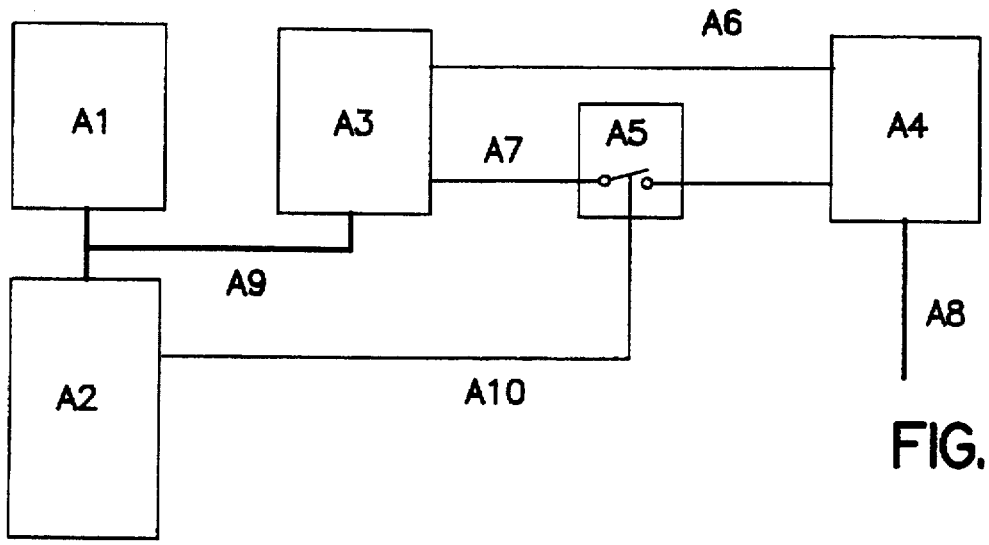
Figure 9:
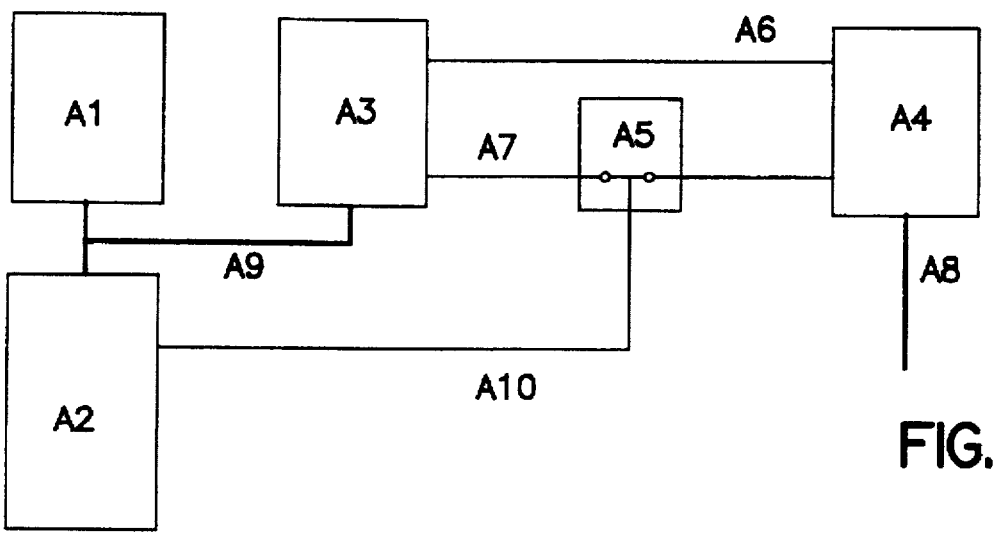
Figure 10:
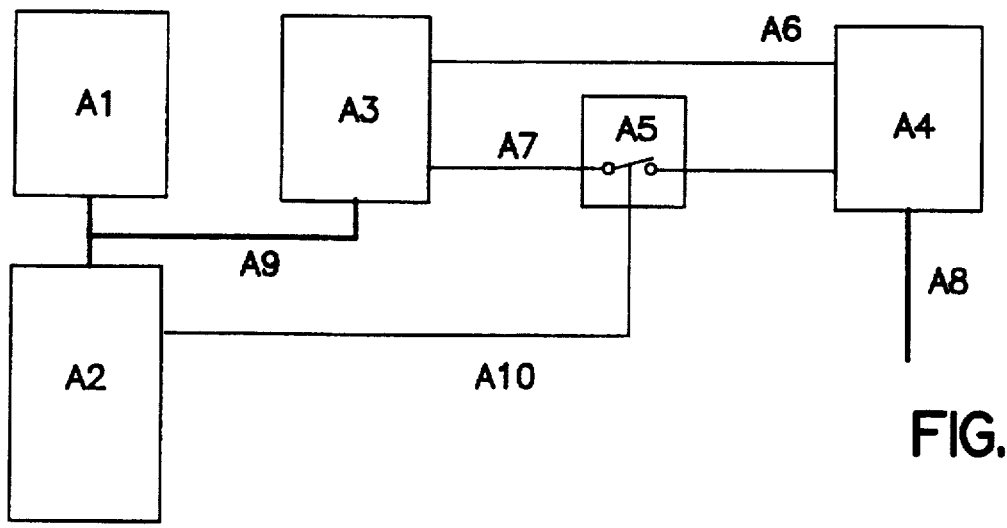

In FIGS. 8 to 10, the various components and functions are as follows:
A1 Memory.
A2 Intelligence (e.g. Nec, CPU, Nec V25+CPU).
A3 Communication control unit (e.g. Philips 82C200).
A4 Connection drive unit (e.g. Philips 82C250).
A5 Activates/deactivates transmission (=contact).
A6 Electrically decoded message (receiving).
A7 Electrically decoded message (transmitting).
A8 Electrically coded message (e.g. ISO 11898).
A9 Internal address, data and control bus.
A10 Activates/deactivates transmission.

FIG. 8 shows the principle structure of the local system. FIG. 9 indicates when the transmission is activated, and FIG. 10 indicates when transmissions are disconnected. FIG. 9 shows the system function after the node (the unit) has received the message which activates/effects the transmission from the node. In FIG. 9, the node/unit has received the message when the transmission is disconnected from the node/unit.

A system can consist of several nodes in accordance with FIG. 8. These nodes are joined together via a communication (bus or other topology). At the system start-up, the CPU reads the memory. The latter contains, inter alia, information on the position of the transmission contact breaker, see FIG. 8, block A5. (The contact will be closed or open). A closed transmission contact breaker means that the module can transmit messages. An open transmission contact breaker means that it is not possible for the module to transmit messages. Irrespective of the position of the transmission contact breaker, the module can at all times receive messages. When the start-up procedure is completed, there is at least one node with an open transmission contact breaker, and at least one with a closed transmission contact breaker. If there are several nodes with a closed transmission contact breaker, there is more information in the memory, which determines which is the master in the system. The tasks of the master include, inter alia, allocating transmission authorization and transmission refusal to nodes or groups of nodes. When a node obtains a transmission authorization message, the CPU of the node closes its transmission contact breaker, see FIG. 9, block A5 and A10. This enables the node to transmit messages. In the same way, the CPU of the node opens the transmission contact breaker when a transmission refusal message is received, see FIG. 10, block A5 and A10. A transmission authorization message and transmission refusal message can be combined in one and the same message, in order, for example, to give authorization to transmit a certain number of messages, a certain number of messages of a certain type, or to authorize transmission at a certain time during a time slot, and so on. Transmission authorization/refusal can also be a combination of the abovementioned variants.

The invention is not limited to the embodiment shown hereinabove by way of example, but instead can be modified within the scope of the attached patent claims and the inventive concept.

I claim:

1. A system for communicating over a serial bus comprising:

a first plurality of transmitting and receiving units connected to said serial bus, said transmitting and receiving units being configured to enter a passive mode upon command which inhibits said units from gaining transmission access to said serial bus while permitting said units to receive data from said serial bus, each of said transmitting and receiving units including access and acknowledgement means for obtaining transmission access to said serial bus, and acknowledging receipt of a message when they are not in the passive state;

a second plurality of transmitting and receiving units connected to said serial bus, said transmitting and receiving units of said second plurality being configured to enter a passive state upon command which inhibits said units from gaining transmission access to said serial bus, inhibiting arbitration and acknowledgement functions on the bus while permitting said units to receive data on said serial bus, said transmitting and receiving units including access and acknowledgement means for obtaining transmission access to said serial bus and acknowledging receipt of a message when said units are not in a passive state;

said first plurality of transmitting and receiving units and said second plurality of transmitting units alternately entering a passive state each of said pluralities of transmitting and receiving units when not in a passive state acknowledging a message received from another unit by applying with said acknowledgement means a data bit to said serial bus which dominates any other data bit on said serial data bus.

2. The system as claimed in claim 1, wherein each plurality of transmitting and receiving units includes a transmitter and receiver unit serving as a master station, and wherein, upon respective completed transmission and reception in an active plurality of transmitting and receiving units, the master station transmits or outputs on the bus connection a dominant signal which can be received by a master station in another plurality of transmitters and receivers station which is in a passive state, the another master station in the another plurality of transmitting and receiving units activating its transmitting and receiving units in an active state.

3. The system as claimed in claim 2, wherein the serial bus connection includes a bus bridge connection connecting one master station to another master station in which information relating to the respective local bus connection can be collected in one bridge unit for distribution from one plurality of transmitting and receiving units to another plurality of transmitting and receiving units, and wherein at least one local bus connection is common to the active transmitter and receiver units in a plurality of transmitting and receiving units.

4. The arrangement as claimed in patent claim 3, wherein each master function or master unit for each subgroup in each active main group is arranged to permit alternate transmission of dominant signals for its transmitter and receiver units.

5. The system as claimed in claim 3, wherein the bridge unit comprises two transmitter/receiver units which are placed at a very short distance from each other thereby reducing the time delay produced by the length of the serial bus connection.

6. The system as claimed in claim 2, wherein each master station is equipped with two transmitter/receiver units, of which one transmitter/receiver unit checks that the message of other transmitter/receiver unit appears correctly on the serial connection and acknowledges the message with said dominant acknowledge signal.

7. The system as claimed in claim 2, wherein a transmitting and receiving unit produces an error message which indicates that it has received an incorrect message during a passive state, which which can be corrected by a respective master unit at a higher protocol level which detects that a first plurality of transmitting and receiving units in its passive state has interpreted a received message as incorrect, despite the fact that a second plurality of transmitting and receiving units has interpreted the message as correct.

8. The system as claimed in claim 2, wherein said master station includes only one transmitter and receiver unit, the plurality of units controlled by the master station comprising one or more transmitting and receiving units which are arranged to assume an active position in which they can transmit an acknowledge signal during the period when the master station is emitting instructions to a respective plurality of transmitting and receiving units.

9. The transmitting and receiving unit of claim 8, wherein said authorization message comprises a command for a plurality of transmitting and receiving unit to enter a passive state.

10. The transmitting and receiving unit of claim 9, wherein said authorization message commands a group of transmitting and receiving units to selectively inhibit said transmission means, and command a second group of transmitting and receiving units to enable the respective transmission means.

11. The system as claimed in claim 1, wherein the system transmits data in which the level on the bus connection is not changed if several identical characters are transmitted from a transmitting and receiving unit.

12. The system as claimed in claim 1, wherein each unit, when access is obtained to said serial bus, indicates the number of bytes of a message the unit will transmit, and which transmits a check sum which the other units calculate, and each of said other units which calculates the same check sum transmits a dominant signal/pulse, which indicates to the transmitting unit that at least one unit has correctly received said message, said at least one unit emitting an error message of dominant signals/pulses when said message is incorrectly received.

13. The system as claimed in claim 1, wherein the dominant signal/pulse for the acknowledgement function and the access function or arbitration is prevented between groups of transmitting and receiving traits of the system.

14. The system as claimed in claim 1, wherein the serial bus connection comprises an optical single-link connection.

15. The system as claimed in claim 1, wherein the serial bus connection consists of an electrical two-wire bus.

16. The system according to claim 1, wherein each of said plurality of transmitting and receiving units includes a master station which commands a transmitting and receiving unit in a respective group to enter a passive state.

17. The system as claimed in claim 16, wherein each transmitting and receiving unit operates with an error-handling protocol and includes a connection access protocol of the token passing type.

18. The system as claimed in claim 16, wherein the transmitting and receiving units are spaced at distances along said serial bus connection which are substantially shorter than the total length of the connection.

19. The system according to claim 16 wherein said transmits and receiving units have substantially the same transmission rate, and each transmitter and receiver unit is inhibited from transmitting a dominant data bit until a clear signal is received from said master station.

20. The system as claimed in claim 1, wherein the distance between units in a plurality transmitting and receiving units is less than about 1/50 the distance between each plurality.

21. The system according to claim 1 wherein each of said plurality of transmitting and receiving units includes at least two transmitting and receiving units.

22. A system for communicating over a serial communications bus comprising:

a plurality of transmitting and receiving units which are adapted to transmit and receive data at substantially the same bit rate arranged in first and second groups, each group including at least one transmitting and receiving unit, said groups of transmitting and receiving units being placed into an active state from a passive state by a received command; and means for transmitting said command to said groups of transmitting and receiving units, alternately placing said groups of transmitting and receiving units into an active state whereby only one of said groups of transmitting and receiving units can arbitrate for transmission access to said serial communications bus at one time and both groups of transmitting and receiving units can receive data on said bus;

access and acknowledgement means at each transmitting and receiving unit for obtaining access through arbitration to said serial communications buss when said transmitting and receiving unit is in an active state and for transmitting a dominant bit as an acknowledgement to other transmitting and receiving units of an active group, each transmitting and receiving units avoiding the enabling arbitration and acknowledgement functions of a transmitting and receiving unit, during a passive state preventing said transmitting and receiving unit from issuing said dominant acknowledgement bit.

23. The system for communicating over the serial bus of claim 22 wherein said means for transmitting said command is a master station within each of said groups of said transmitting and receiving units.

24. The system for communicating over a serial bus of claim 22, wherein said access and acknowledge means is initiated by said transmitting and receiving units in an active state by first determining that said serial bus is free, and then transmitting a dominant bit which is used by the remaining units of a group of transmitting and receiving units synchronizing this data for transmitting and receiving data, each transmitting and receiving unit which transmits data also receiving its own data on said serial bus, wherein any transmitting and receiving unit which detects a dominant bit on said serial bus which has sent a non dominant bit yield access to said data bus.

25. The system for communicating over a serial bus of claim 22 wherein a transmitting and receiving unit which has obtained access to said serial bus transmits a message with a check sum, and each transmitting and receiving unit in said active state calculates a check sum from said message, and places a dominant bit on said serial bus to indicates said agreement between said transmitted check sum and calculated check sum.

26. In a system for communicating over a serial bus by a plurality of transmitting and receiving units which generates an acknowledgement or error response to every received message for transmission on said serial bus, a transmitting receiving unit comprising:

a connection drive interface connected to said bus;

a communication control unit connected to said connection drive interface for receiving data on said serial bus, and for producing transmitted messages, including an acknowledgement bit and an error frame in response to said received data from said serial data bus;

transmission means for selectively connecting said transmitted messages to said connection drive interface whereby said messages are placed on said serial bus; and control means connected to said communications control unit for selectively operating said transmission means when an error free authorization message has been received by said communication control unit, and for inhibiting responses while permitting reception of data from said serial bus until said error free authorization message is received.

27. The transmitting receiving unit of claim 26 wherein said authorization message is transmitted by another transmitting and receiving unit on said bus.

28. The transmitting and receiving unit of claim 26 wherein said authorization message is a clear command from a master station connected to said serial bus.

* * * * *